No. 882,613.   
PATENTED MAR. 24, 1908.
F. M. BEAMER.
STUFFING BOX.
APPLICATION FILED JULY 18, 1907.
2 SHEETS—SHEET 1.
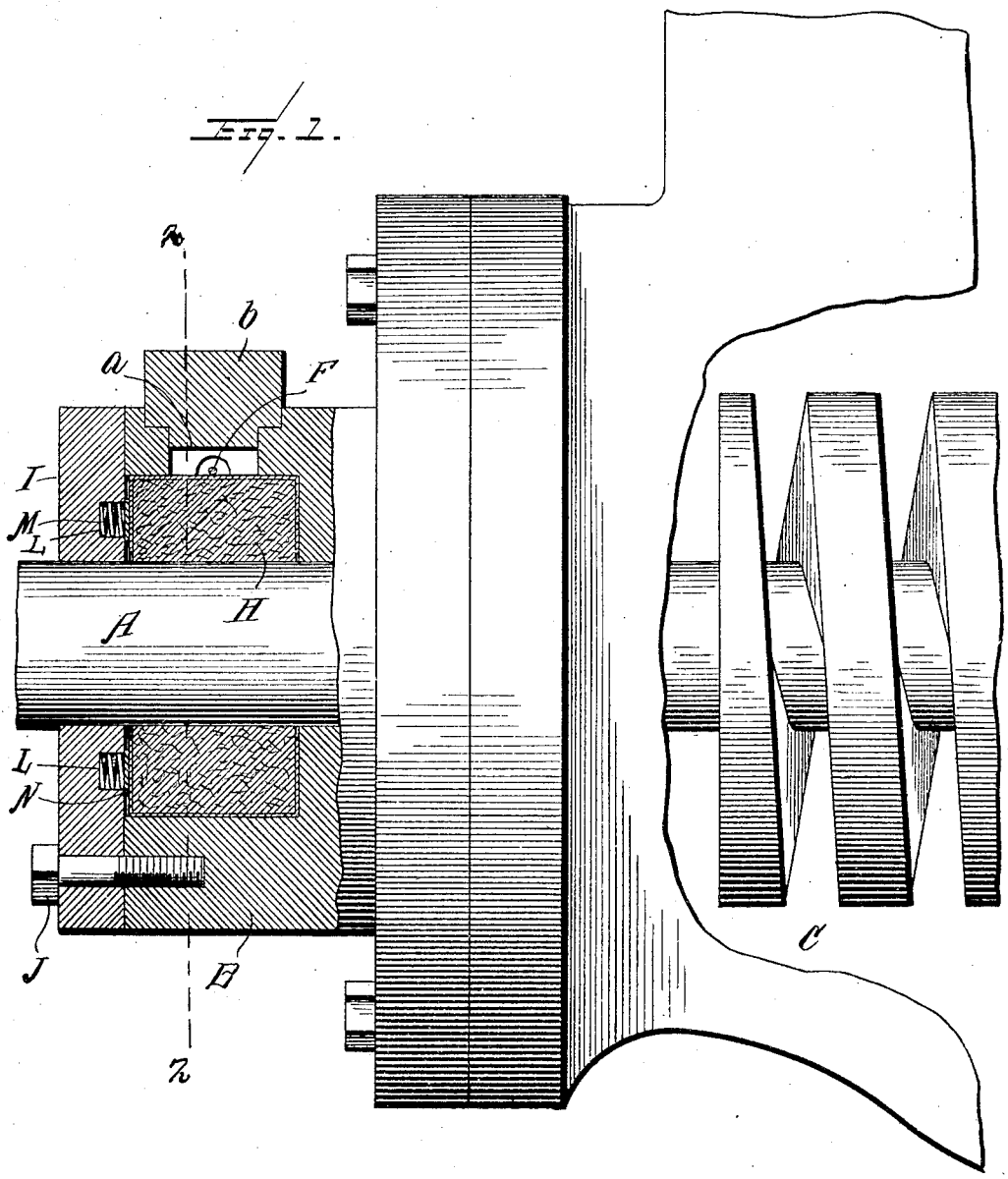
WITNESSES:
INVENTOR
Ferdinand M. Beamer,
BY
W. A. Redmond
Attorney No. 882,613. PATENTED MAR. 24, 1908.
F. M. BEAMER.
STUFFING BOX.
APPLICATION FILED JULY 18, 1907.
2 SHEETS—SHEET 2.
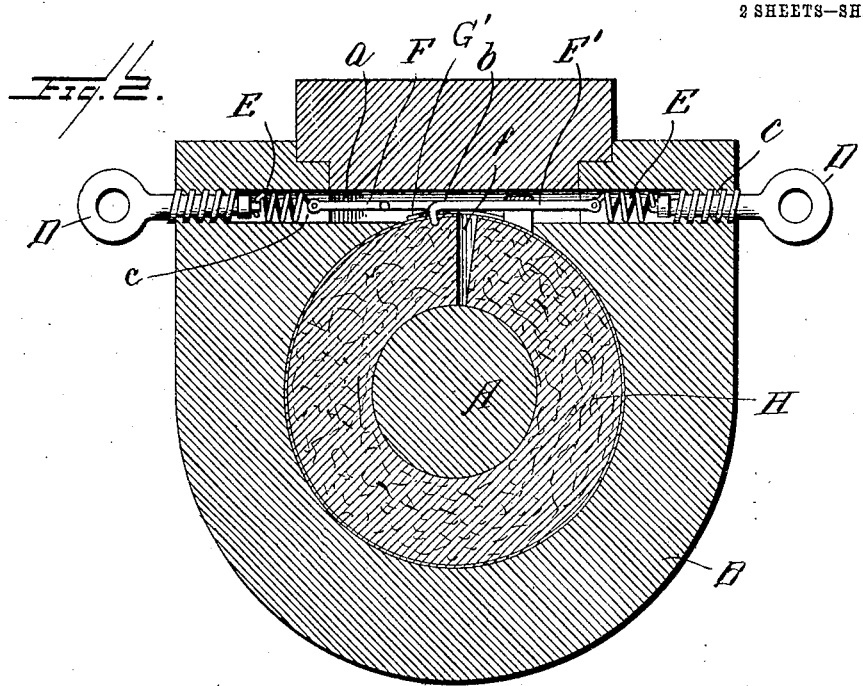
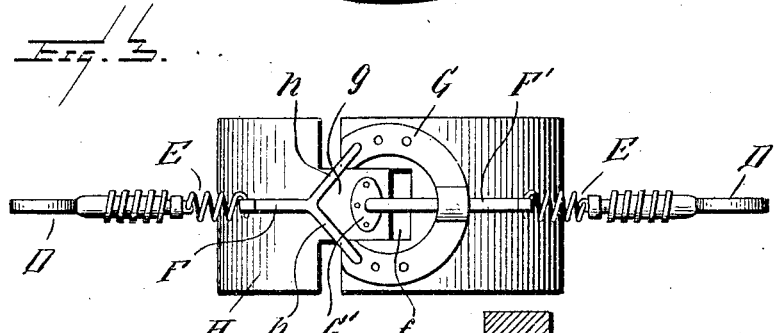
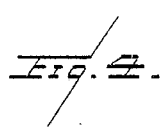
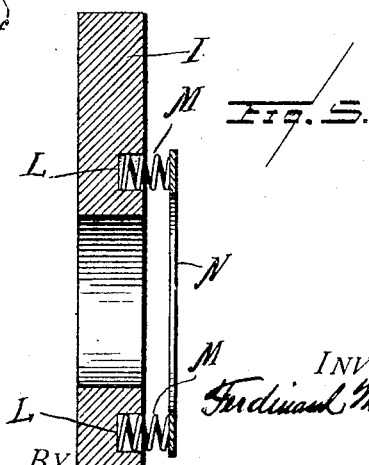
WITNESSES:
INVENTOR
Ferdinand M. Beamer,
BY
Attorney

UNITED STATES PATENT OFFICE.

FERDINAND M. BEAMER, OF PHILADELPHIA, PENNSYLVANIA.

STUFFING-BOX.

No. 882,613.　　　Specification of Letters Patent.　　　Patented March 24, 1908.

Application filed July 18, 1907. Serial No. 384,391.

*To all whom it may concern:*

Be it known that I, FERDINAND M. BEAMER, a citizen of the United States, residing at Philadelphia, in the county of Philadelphia and State of Pennsylvania, have invented a certain new and useful Improvement in Stuffing-Boxes, of which the following is a specification.

This invention relates to packings for shafts, and it has for its object to provide a simple, durable, and comparatively inexpensive device by the use of which the packing may be quickly adjusted to the shaft and maintained in its adjusted position at all times notwithstanding any vibration of the shaft due to want of alinement, and it consists of the parts and combinations of parts hereinafter described and claimed.

In the accompanying drawings, forming a part of this specification, Figure 1 is a side view, partly broken away, of my improvement applied to a shaft. Fig. 2 is a vertical section on the line 2—2, Fig. 1. Fig. 3 is a detail plan view of the packing and adjusting means therefor. Fig. 4 is a detail view showing the construction of the packing. Fig. 5 is a detail view of the cap for the box.

Similar letters refer to similar parts throughout all the views.

Referring to the drawings A represents the worm shaft, B the stuffing box case, which is bolted to the frame of the engine, and C the oil case in which the worms on the shaft work. The stuffing box B is formed with an opening $a$ at its top, for which is provided a cover $b$, whereby access may be had to the interior of the box, and it is also formed with the laterally extending threaded perforations $c$ entering from opposite sides and terminating in the opening $a$ in line with each other, as best shown in Fig. 2, for the adjusting screws D. To the screws D are swiveled the ends of the coiled tension springs E, the opposite ends of said springs being secured to the ends of the straps F, and the other ends of said straps being firmly attached to the holding plates G, G', which are rigidly secured to the packing H. The preferred manner of connecting the straps F, F' to the plates G G' is by forming perforations in the plates and binding the ends of the straps so that they may be hooked into said perforations, but any other convenient or suitable connection may be made between the parts so that a firm attachment is provided and one that may be readily made through the opening $a$.

The packing H is preferably composed of braided flax $d$ partly inclosed or surrounded by a canvas strip or backing $e$ to which the plates G, G' are secured in any preferred manner. One end of the packing is formed with a groove $f$ in order to receive the tongue $g$ which is formed on the other end. The plate G is designed to be applied to the outer surface of the packing at the grooved end thereof and for that reason it is formed horse-shoe shaped and it is also struck up at its middle portion in order to permit of the passage of the strap F' thereunder to connect with the plate G', which is secured to the tongue $g$ of the packing. The strap F is divided or otherwise formed with the fingers $h$ to adapt it to reach the ends of the plate G at each side of the groove $f$ in order to enable the fingers to be connected thereto. This arrangement also causes the side walls of the groove $f$ to be drawn tightly against the sides of the tongue $g$ when the straps are adjusted. Thus it will be observed that the straps draw or pull the packing ends in opposite directions or toward each other when the screws D are adjusted outwardly and that the springs E permit of vibration of the shaft should it happen that it becomes out of line.

The openings or perforations $c$ are formed on a line slightly below the upper or top plane of the packing. This arrangement or location of the perforations $e$ causes the straps to pull down on the packing at an oblique angle and thus draw and maintain the same in close contact with the shaft at all points on its circumference.

A cap I is provided for the mouth of the stuffing box and to which it is secured by the screw bolts J, and on the inner face of said cap recesses or pockets L are formed to receive the coiled springs M. See Fig. 5. An annular ring or plate N is secured to the outer ends of the springs M. The springs M exert their pressure through the ring or plate N on the outer side of the packing in order to keep it pressed back against the bottom of the stuffing box.

From the above description it will be understood that the adjacent ends of the packing may be drawn toward each other by means of the screws D to cause the packing to closely embrace the shaft, and that the packing may yield to any variations in alinement of the shaft to prevent undue or uneven wear on any part thereof by reason of the springs E yielding to permit of vibration while still holding the packing in close contact with the shaft at all points thereof.

While I have described a simple, inexpensive, and durable means for connecting the straps to the packing I do not desire to be limited to such means as it is obvious the straps may be directly secured to the packing without the interposition of the plates.

What I claim is:

1. A packing for shafts comprising a stuffing box, a packing adapted to surround the shaft, oppositely disposed adjusting screws connected to the ends of said packing and adapted to draw the ends of said packing toward each other.

2. A packing for shafts comprising a stuffing box, oppositely disposed adjusting screws entering said box, a packing adapted to surround the shaft, and means for connecting said screws to the ends of said packing, whereby the adjustment of the screws will draw the ends of said packing toward each other.

3. A packing for shafts comprising a stuffing box, oppositely disposed adjusting screws entering said box, a packing adapted to surround the shaft, and straps connecting the ends of said packing to said screws, whereby the adjustment of the screws will draw the ends of said packing toward each other.

4. A packing for shafts comprising a stuffing box, oppositely disposed adjusting screws entering said box, a packing adapted to surround a shaft, straps connected to the ends of said packing, and springs connecting the straps and the ends of the screws.

In testimony whereof, I affix my signature, in the presence of two witnesses.

FERDINAND M. BEAMER.

Witnesses:
J. H. GALLAHER,
CHARLES LOWELL HOWARD.